(12) United States Patent
Bhose et al.

(10) Patent No.: US 8,468,146 B2
(45) Date of Patent: Jun. 18, 2013

(54) SYSTEM AND METHOD FOR CREATING SEARCH INDEX ON CLOUD DATABASE

(75) Inventors: Rajarshi Bhose, Kolkata (IN); Kashyap Chimanlal Santoki, Rajkot (IN); Subhadip Sarkar, Bangalore (IN)

(73) Assignee: Infosys Limited (IN)

( * ) Notice: Subject to any disclaimer, the term of this patent is extended or adjusted under 35 U.S.C. 154(b) by 393 days.

(21) Appl. No.: 12/796,897

(22) Filed: Jun. 9, 2010

(65) Prior Publication Data

US 2011/0252018 A1    Oct. 13, 2011

(30) Foreign Application Priority Data

Apr. 13, 2010   (IN) .......................... 1031/CHE/2010

(51) Int. Cl.
*G06F 17/30* (2006.01)
(52) U.S. Cl.
USPC .......................................... 707/711; 707/741
(58) Field of Classification Search
None
See application file for complete search history.

(56) References Cited

U.S. PATENT DOCUMENTS

| 6,169,983 | B1* | 1/2001 | Chaudhuri et al. ................. 1/1 |
| 2011/0225136 | A1* | 9/2011 | Tu et al. ........................ 707/706 |
| 2011/0288946 | A1* | 11/2011 | Baiya et al. .................. 705/26.1 |

* cited by examiner

*Primary Examiner* — Anteneh Girma
(74) *Attorney, Agent, or Firm* — Lerner, David, Littenberg, Krumholz & Mentlik, LLP

(57) ABSTRACT

A method for creating a search index on cloud database is provided. The method enables providing inputs for creating multiple indexes on documents stored in the cloud database. One of the inputs may include a first value representing number of documents to be assigned a single index. The method further enables determining total number of documents stored in the cloud database which is represented by a second value. Further, the method enables estimating total number of indexes to be created based on first value and second value. The method further comprises executing a loop to create multiple indexes for a predetermined number of iterations which corresponds to the estimated value. Furthermore, the method comprises indexing documents for creating the multiple indexes. Finally, the method comprises merging the multiple indexes to create a single index which facilitates a user to search documents stored in the cloud database.

14 Claims, 3 Drawing Sheets

SYSTEM AND METHOD FOR CREATING SEARCH INDEX ON CLOUD DATABASE

BACKGROUND OF THE INVENTION

The present invention is directed towards cloud databases and more specifically to a system and method for creating search index on cloud database.

With proliferation of data over the internet, there is an increasing need for systems capable of storing and processing large amount of data. Further, faster retrieval of the huge data is also becoming a necessity. Cloud computing provides an efficient way of storing and processing a large amount of data in databases generally known as cloud databases. Cloud databases are non-relational databases which store and manage data in a distributed environment. The cloud databases are key-value based databases where data is stored and tagged with a key. Data in cloud databases is typically retrieved using key-value based approach.

However, retrieving data from cloud databases using key-value based queries is a time consuming process as the databases are, typically, scanned completely till the location of the data to be retrieved is identified. Further, one or more programmatic processes may be employed for conducting search over the cloud databases. The programmatic processes iterate over data retrieved from the key-value based queries and, then, the required data is extracted from the results of the iteration. However, this process is more time consuming. Also, this process is not user friendly as the user would require knowledge of one or more programming languages for performing the iteration over data retrieved as a result of key-value based queries. To speed up the processing time, additional hardware may be required which in turn would increase the complexity. Thus, an efficient search system for cloud databases which makes the data stored in the databases easily accessible to the user does not exist.

In light of the abovementioned disadvantages, there is a need for a system and method which would facilitate faster retrieval of data from the cloud databases. There is a need for a system and method that would facilitate the user to easily access the data stored in the databases without using the key-value based approach for data retrieval. Additionally, there is a need for a system and method for an effective index based search mechanism on cloud databases to quickly search and retrieve data stored in the distributed databases.

BRIEF SUMMARY OF THE INVENTION

A computer implemented method for creating a search index on cloud database is provided. The method comprises, firstly, providing one or more inputs for creating a plurality of indexes on documents stored in the cloud database. The one or more inputs include at least in part a first value representing number of documents to be assigned a single index. Secondly, the method includes determining total number of documents stored in the cloud database. The total number of documents is represented by a second value. Further, the method comprises estimating total number of indexes to be created based on the first value and the second value. The method further comprises executing a loop to create plurality of indexes on documents for a predetermined number of iterations. The predetermined number of iterations corresponds to the estimated value. Finally, the method comprises merging the plurality of indexes to create a single index. The single index facilitates a user to search the documents stored in the cloud database.

In an embodiment of the present invention, the computer implemented method further comprises retrieving one or more documents from the cloud database based on the iterations. Furthermore, the method comprises indexing one or more documents for creating the plurality of indexes. In another embodiment of the present invention, the computer implemented method further comprises providing one or more inputs for creating at least one index on documents stored in the cloud database.

In an embodiment of the present invention, the first value representing number of documents to be assigned a single index is determined based on identifying at least one of total number of documents stored in the database or total number of subsets available in the database or the total number of threads to be initiated by a thread pool or combinations thereof.

In an embodiment of the present invention, providing one or more inputs comprises the steps of, firstly, providing a database name corresponding to least one database for which a plurality of indexes are to be created. Secondly, the method comprises providing a directory path corresponding to a specific location on a cloud database for storing the plurality of indexed documents. In another embodiment of the present invention, determining total number of documents stored in the cloud database comprises accessing the database using the database name and calculating number of documents stored in the database.

In an embodiment of the present invention, the loop includes one or more inputs. The one or more inputs are the database name representing the database, start key and end key associated with the documents stored in the database. In another embodiment of the present invention, retrieving documents from the cloud database based on the iteration comprises retrieving all the documents tagged with keys that are stored between the start key and end key, each time the loop is executed.

In an embodiment of the present invention, indexing the retrieved documents for creating a plurality of indexes comprises, firstly, reading content of each of the documents. Secondly, the method comprises processing the documents in parallel for carrying out indexing of the documents to create the plurality of indexed documents. Finally, the method comprises storing the plurality of indexed documents in a specific location in a database using the directory path information.

A system for creating a search index on cloud database is provided. The system comprises a cloud database which comprises one or more databases. The system further comprises an indexing search engine in communication with the cloud database and an index generator. The index generator is in communication with the cloud database and the indexing engine and facilitates creating a single index on documents stored in the cloud database.

In an embodiment of the present invention, the index generator is configured to create a plurality of indexes on the documents stored in the cloud database using the indexing engine, merge the plurality of indexes into a single index, and store the single index in a specific location in a database. In an embodiment of the present invention, the indexing engine comprises a lucene engine.

In another embodiment of the present invention, the index generator comprises a pre-processing module. The pre-processing module is configured to facilitate a user to provide one or more inputs for creating a plurality of indexes on documents stored in the cloud database via an interface. The one or more inputs include at least in part a first value representing number of documents to be assigned a single index. In an embodiment of the present invention, the index generator comprises a fetching module configured to retrieve all the documents stored in the database and calculate the total number of documents. The total number of documents is represented by a second value. In yet another embodiment of the present invention, the index generator comprises an estimation module configured to receive the first value from the pre-processing module and receive the second value from the fetching module. The estimation module, then, estimates the total number of indexes to be created based on the first value and the second value.

In an embodiment of the present invention, the index generator comprises an execution module configured to receive the estimated value from the estimation module. The execution module further executes a loop for creating the plurality of indexes for a predetermined number of iterations. The predetermined number of iterations corresponds to the estimated value. Further, the estimation module retrieves the documents from the documents corresponding to each iteration and indexes the documents using the indexing engine. This results in creation of the plurality of indexes. Finally, the index generator stores the plurality of indexed documents.

In an embodiment of the present invention, the index generator comprises a generation module configured to merge the indexed documents to create a single index.

A computer program product for creating a search index on cloud database is provided. The computer program product comprises program instruction means for providing one or more inputs for creating a plurality of indexes on documents stored in the cloud database. The one or more inputs include at least in part a first value representing number of documents to be assigned a single index. The computer program product further comprises program instruction means for determining total number of documents stored in the cloud database. The total number of documents is represented by a second value. Further, the computer program product comprises program instruction means for estimating total number of indexes to be created based on the first value and the second value. Furthermore, the computer program product comprises program instruction means for executing a loop to create plurality of indexes on documents for a predetermined number of iterations. The predetermined number of iterations corresponds to the estimated value. Finally, computer program product comprises program instruction means for merging the plurality of indexes to create a single index. The single index facilitates a user to search the documents stored in the cloud database.

The present invention is described by way of embodiments illustrated in the accompanying drawings wherein:

DETAILED DESCRIPTION

A method and system for creating a search index over cloud database is provided. The invention provides for a method and system that facilitates user to efficiently conduct search over data stored in one or more cloud databases. Also, the invention facilitates speeding up the process of retrieving data from the one or more cloud databases. The invention enables enhancing the process of creating a search index over huge sets of data stored in the cloud database in a faster and efficient manner. The invention further enables the user to avoid a key-value based approach to search and retrieve the data.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
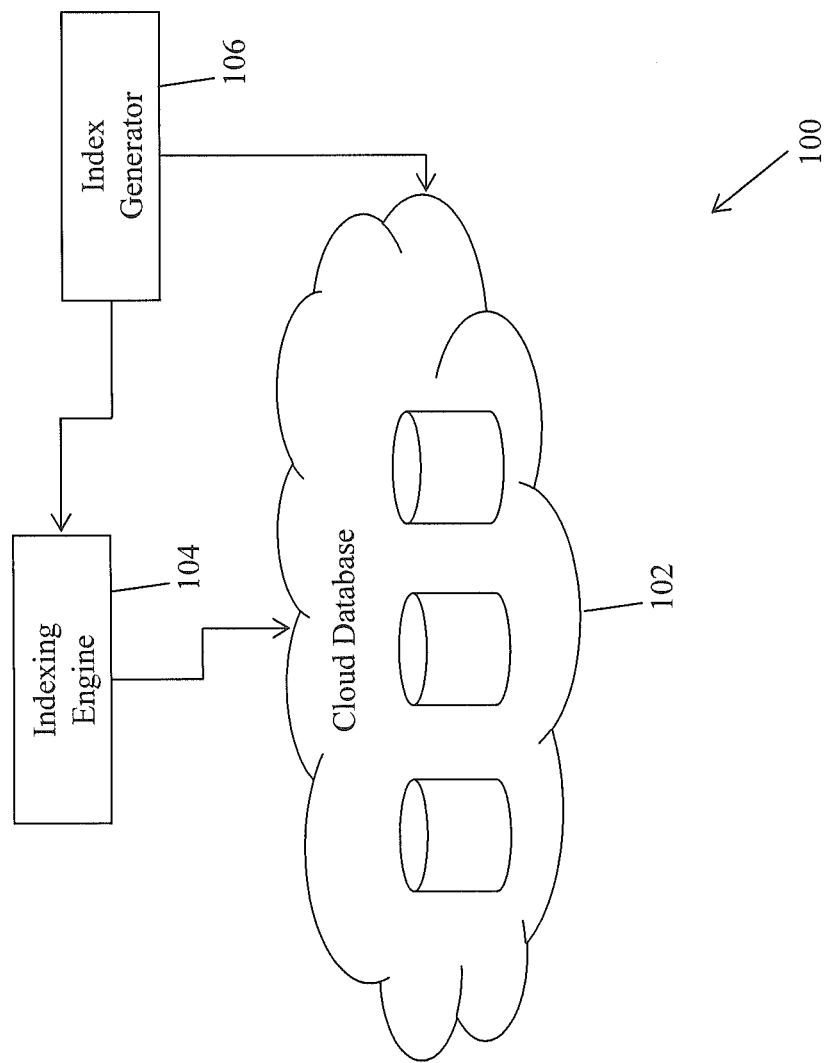
FIG. 1 is a block diagram of a system for creating search index on cloud database, in accordance with an embodiment of the present invention.

FIG. 1 is a block diagram illustrating a system 100 for creating a search index on cloud database, in accordance with an embodiment of the present invention. In various embodiments of the present invention, the system 100 comprises a cloud database 102, an indexing engine 104, and an index generator 106.

The cloud database 102 is a non relational database which stores and manages huge sets of data in a distributed manner. Examples of cloud databases 102 may include Amazon Simple DB, Apache Couch DB or any other document oriented key-value database. The cloud database 102 may comprise a processing engine (not shown) for handling storage and retrieval of the huge datasets. The data may be accessed via a cloud computing interface which may be provided on a user's computing device. In an embodiment of the present invention, the cloud database 102 may include one or more document oriented databases which stores documents in the form of key-value pairs. Each document is associated with a key which is a unique identification for each document in a particular database and the value represents the document in the same database.

The indexing engine 104 is an information retrieval software library which may be employed for indexing of documents stored in the cloud database 102. The indexing engine 104 also facilitates searching the documents stored in the cloud database 102. In an embodiment of the present invention, the indexing engine 104 may be a lucene engine. For example, Apache Lucene 2.4.0 may be used to provide a search application programming interface (API) to index the data stored in the cloud database 102 using the index generator 106.

The index generator 106 is a software module which facilitates creating a search index on the cloud database 102. The index generator 106 communicates with the cloud database 102 and the indexing engine 104 to create multiple indexes on documents stored in the cloud database 102. The index generator 106, then, merges the indexes into a single index.

In various embodiments of the present invention, the single merged index may be accessed by a user for faster searching and retrieval of documents stored in the cloud database 102 via a front-end interface. The front-end interface may include a web-based search interface which is provided on the user's computing device. Based on the search queries fed by the user via the web-based search interface, search may be performed on the single merged index and documents matching the search query may be retrieved. The user may use any search semantic for conducting the search over the search index. In an embodiment of the present invention, graphical representation of the search performed on the index may also be obtained. For example, a search index graph may be obtained which represents the "cs uri stem" field in the x coordinate and the time field in the y-coordinate corresponding to the search query.

Figure 2:
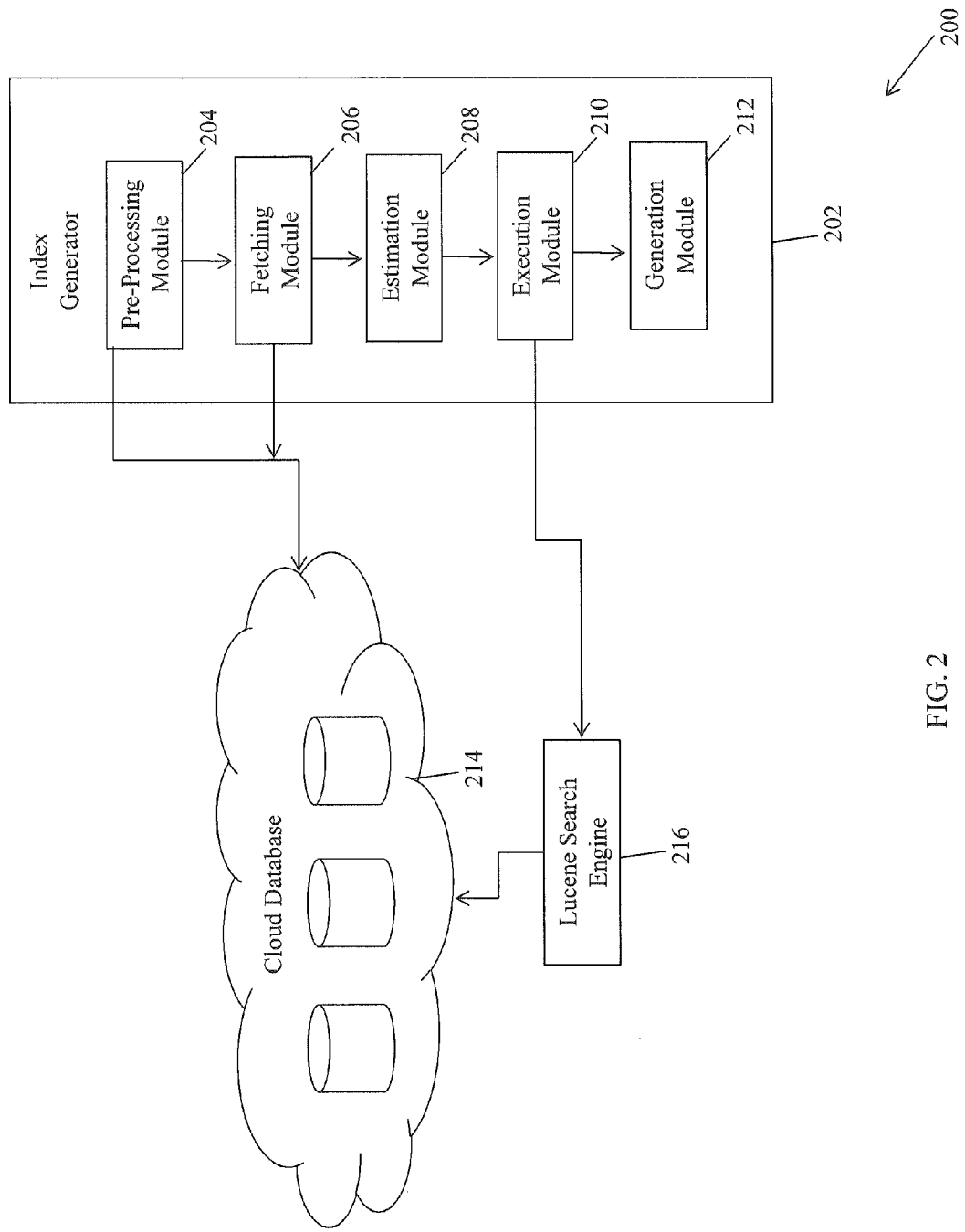
FIG. 2 is a detailed block diagram of an index generator for creating search index on cloud database, in accordance with an embodiment of the present invention.

FIG. 2 is a detailed block diagram of an index generator 202 for creating a search index on the cloud database 214, in accordance with an embodiment of the present invention. In various embodiments of the present invention, the index generator 202 comprises a pre-processing module 204, a fetching module 206, an estimation module 208, an execution module 210, and a generation module 212. The cloud database 214 may comprise one or more databases. Further, the index generator 202 communicates with the cloud database 214 and the indexing engine 216.

The pre-processing module 204 is a software module which facilitates the user to provide one or more inputs for creating multiple indexes on documents stored in the cloud database 214. In an embodiment of the present invention, the user may be a developer or any other person creating the search index on the cloud database 214. The user may be prompted via an interface to provide the inputs that are required prior to creating the multiple indexes. In an embodiment of the present invention, the one or more inputs include a database name of a database in the cloud database 214 for indexing documents stored in that database. In another embodiment of the present invention, the one or more inputs may include number of documents that are to be assigned a single index which may be represented by a value (hereinafter referred as assigned value). In yet another embodiment of the present invention, the one or more inputs may include directory path of a location in a database where the multiple indexes are to be stored.

The fetching module 206 is a software module which receives a database name of a particular database in the cloud database 214 from the pre-processing module 204. The fetching module 206 then communicates with the cloud database 214 to retrieve all the documents that are stored in the particular database using the database name. In an embodiment of the present invention, the user may provide a "GET" request via the interface and the fetching module 206 retrieves the documents from the cloud database 214. Further, the fetching module 206 determines a value that represents the total number of documents retrieved from the cloud database 214 (hereinafter referred as extracted value).

The estimation module 208 is a software module which receives the extracted value from the fetching module 206. Further, the estimation module 208 receives the assigned value from the pre-processing module 204. The estimation module 208, then, estimates the total number of indexes to be created using the received values to index all the documents that are stored in the cloud database 214 (hereinafter referred as estimated value). In an embodiment of the present invention, the estimated value is obtained by dividing the extracted value by the assigned value.

The execution module 210 is a software module which receives the information related to the total number of indexes to be created on the documents from the estimation module 208. Based on the information received from the estimation module 208, the execution module 210 facilitates creating multiple indexes on the documents retrieved by the fetching module 206, employing the indexing engine 216. In an embodiment of the present invention, the execution module 210 executes a loop for creating multiple indexes on the documents. The loop is executed for a predetermined number of times which is equal to the total number of indexes that are to be created i.e. the estimated value. The inputs provided in the loop may include database name, start key and end key of the documents which are to be retrieved. The start key and end key signifies all the documents that are to be retrieved in a single execution of loop. Documents corresponding to the start key and end key are retrieved each time the loop is executed. The execution module 210, then, indexes the documents employing the indexing engine 216. The indexing engine 216 may implement parallel processing techniques for creating multiple indexes on the documents retrieved. The total number of indexes created is equal to the total number of indexes as estimated by the estimation module 208. The execution module 210 receives the directory path information from the pre-processing module 204 and stores the multiple indexed documents in a particular location in a database represented by the directory path.

The generation module 212 is a software module which receives the multiple indexes from the execution module 210 and merges the indexes into a single index. The directory path of the location of the multiple indexes is provided to the generation module 212 for merging the multiple indexes into a single index. The generation module 212 stores the merged single index as a search index in a predetermined location on a local file system. In an exemplary embodiment of the present invention, the local file system may be a special purpose database which stores, organizes and manipulates data related to the search index to facilitate the user to access the search index.

Figure 3:
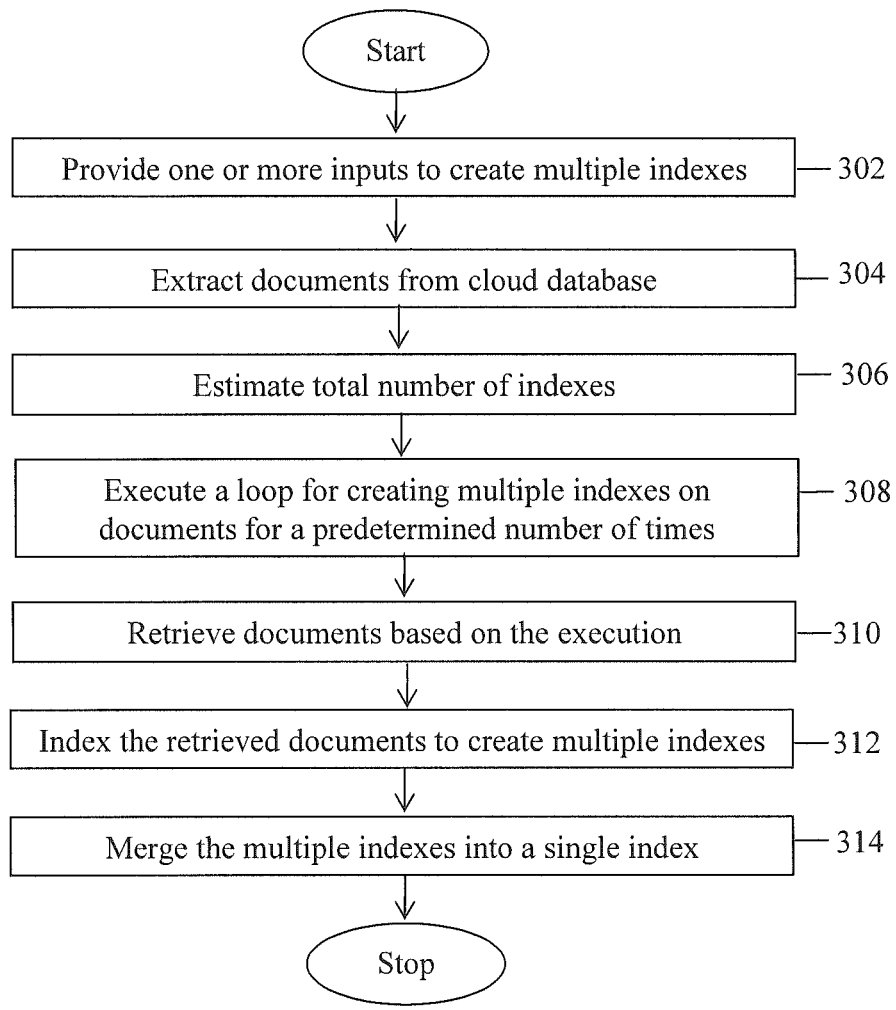
FIG. 3 is a flowchart illustrating a method for creating search index on cloud database, in accordance with an embodiment of the present invention.

FIG. 3 is a flowchart illustrating a method for creating a search index on cloud database, in accordance with an embodiment of the present invention.

At step 302, user is prompted to provide one or more inputs for creating multiple indexes on documents stored in one or more databases. In an embodiment of the present invention, the one or more inputs include a database name. Database name represents the database for which indexes are to be created on documents stored in that database. In another embodiment of the present invention, the one or more inputs include a value which represents number of documents that may be included in a single index. In an exemplary embodiment of the present invention, the number of documents which are to be assigned a single index may be determined by a process which identifies total number of documents, total number of subsets available in the database, and number of threads to be initiated by a thread pool. Subset may be defined as a unit in the database consisting of multiple documents. The number of threads in the thread pool may be determined by hardware or operating environmental configuration of the index generator 202. Thread pool is defined as a fixed number of threads (worker threads) which are managed centrally by a thread pool manager (not shown) and are used to perform iterations without the requirement of an overhead of creating new threads on demand. Further, the thread pool manager (not shown) associates each worker thread with the identified subsets. Based on the abovementioned, number of documents which are to be assigned a single index is determined and is represented by a value (hereinafter referred as assigned value). In yet another embodiment of the present invention, the one or more inputs include a directory path which represents the location in a database where the multiple indexes are to be finally stored.

At step 304, documents from the one or more cloud databases are extracted. In various embodiments of the present invention, using the database name, total number of documents stored in a particular database is obtained. The database name facilitates to establish connection with the database from which documents are to be obtained. The extracted documents are, then, used to determine the total number of documents stored in the database and is represented by a value (hereinafter referred as extracted value). In an embodiment of the present invention, a request line such as a "GET" request may be sent to the database using the database name for obtaining the total number of documents stored in the document.

At step 306, total number of indexes to be created is estimated. In various embodiments of the present invention, the total number of indexes which are required for including all the documents present in the database is estimated and is represented by a value (hereinafter referred as estimated value). The estimation is performed using the extracted value and the assigned value. In an embodiment of the present invention, the estimated value is obtained by dividing the extracted value by the assigned value.

At step 308, a loop for creating multiple indexes is executed for a predetermined number of times. In various embodiments of the present invention, the predetermined number of times is equal to the estimated value. The loop may be a threaded loop that includes inputs such as database name and start key and end key for the documents stored in the database. Key is a unique identification associated with each document stored in the database. The start key is a unique identification of a particular document stored in the database in a particular location. The end key is a unique identification of another document stored in the database at another location. The start key and end key input is provided to identify all the documents between the start key and the end key. In an embodiment of the present invention, "GET" request may be sent to the database using the database name and start key and end key in each successive iteration.

At step 310, documents are retrieved from the database based on the iteration performed at step 308. In various embodiments of the present invention, the keys to the documents stored in the database may be arranged in a sequential order. All the documents between the start key and the end key may be retrieved in response to the "GET" request.

At step 312, multiple documents which are retrieved are indexed. In various embodiments of the present invention, content in each of the documents that are retrieved is read. The documents are, then, indexed using an indexing engine employing a parallel processing technique. The indexing engine is an information retrieval software library which may be employed for creating the multiple indexes on the documents. The multiple indexes are separate indexes and the number of the indexes is equal to the estimated value which represents the total number of indexes to be created. The multiple indexes are stored in a location represented by the directory path provided in step 302.

At step 314, the multiple indexes are merged into a single index. In various embodiments of the present invention, a single merged index is finally created by merging the multiple indexes using the indexing engine. The single merged index is, then, stored in a separate location Various embodiments of the present invention, may be implemented in or involve one or more computer systems. The computer system is not intended to suggest any limitation as to scope of use or functionality of described embodiments. The computer system includes at least one processing unit and memory. The processing unit executes computer-executable instructions and may be a real or a virtual processor. The computer system may include a multi-processing system which includes multiple processing units for executing computer-executable instructions to increase processing power. The memory may be volatile memory (e.g., registers, cache, random access memory (RAM)), non-volatile memory (e.g., read only memory (ROM), electrically erasable programmable read only memory (EEPROM), flash memory, etc.), or combination thereof. In an embodiment of the present invention, the memory may store software for implementing various embodiments of the present invention.

Further, the computer system may include components such as storage, one or more input computing devices, one or more output computing devices, and one or more communication connections. The storage may be removable or non-removable, and includes magnetic disks, magnetic tapes or cassettes, compact disc-read only memories (CD-ROMs), compact disc rewritables (CD-RWs), digital video discs (DVDs), or any other medium which may be used to store information and which may be accessed within the computer system. In various embodiments of the present invention, the storage may store instructions for the software implementing various embodiments of the present invention. The input computing device(s) may be a touch input computing device such as a keyboard, mouse, pen, trackball, touch screen, or game controller, a voice input computing device, a scanning computing device, a digital camera, or another computing device that provides input to the computer system. The output computing device(s) may be a display, printer, speaker, or another computing device that provides output from the computer system. The communication connection(s) enable communication over a communication medium to another computer system. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media includes wired or wireless techniques implemented with an electrical, optical, RF, infrared, acoustic, or other carrier. In addition, an interconnection mechanism such as a bus, controller, or network may interconnect the various components of the computer system. In various embodiments of the present invention, operating system software may provide an operating environment for software's executing in the computer system, and may coordinate activities of the components of the computer system.

Various embodiments of the present invention may be described in the general context of computer-readable media. Computer-readable media are any available media that may be accessed within a computer system. By way of example, and not limitation, within the computer system, computer-readable media include memory, storage, communication media, and combinations thereof.

Having described and illustrated the principles of the invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A computer implemented method for creating a search index on cloud database, the method comprising the steps of:
   providing one or more inputs for creating a plurality of indexes on documents stored in the cloud database, wherein the one or more inputs include at least in part a first value representing number of documents to be assigned a single index;
   determining total number of documents stored in the cloud database, wherein the total number of documents is represented by a second value;
   estimating total number of indexes to be created based on the first value and the second value;
   executing a loop to create plurality of indexes on documents for a predetermined number of iterations, wherein the predetermined number of iterations correspond to the estimated value; and
   merging the plurality of indexes to create a single index, wherein the single index facilitates a user to search the documents stored in the cloud database.

2. The computer implemented method of claim 1 further comprising:
   retrieving one or more documents from the cloud database based on the iterations; and
   indexing one or more documents for creating the plurality of indexes.

3. The computer implemented method of claim 1 further comprising providing one or more inputs for creating at least one index on documents stored in the cloud database.

4. The computer implemented method of claim 1, wherein the first value representing number of documents to be assigned a single index is determined based on identifying at least one of total number of documents stored in the database or total number of subsets available in the database or the total number of threads to be initiated by a thread pool or combinations thereof.

5. The computer implemented method of claim 1, wherein the step of providing one or more inputs comprises the steps of:
   providing a database name corresponding to least one database for which a plurality of indexes are to be created; and
   providing a directory path corresponding to a specific location on a cloud database for storing the plurality of indexed documents.

6. The computer implemented method of claim 5, wherein the step of determining total number of documents stored in the cloud database comprises accessing the database using the database name and calculating number of documents stored in the database.

7. The computer implemented method of claim 1, wherein the loop includes one or more inputs, the one or more inputs being the database name representing the database, start key and end key associated with the documents stored in the database.

8. The computer implemented method of claim 2, wherein the step of retrieving documents from the cloud database based on the iteration comprises retrieving all the documents tagged with keys that are stored between start key and end key, each time the loop is executed.

9. The computer implemented method of claim 2, wherein the step of indexing the retrieved documents for creating a plurality of indexes comprises:
   reading content of each of the documents; and
   processing the documents in parallel for carrying out indexing of the documents to create the plurality of indexed documents; and
   storing the plurality of indexed documents in a specific location in a database using the directory path information.

10. A system for creating a search index on cloud database, the system comprising:
   a cloud database comprising one or more databases;
   an indexing engine in communication with the cloud database via a processing engine and configured to facilitate searching and indexing documents stored in the cloud database; and
   an index generator in communication with the cloud database and the indexing engine via the processing engine and configured to creating a single index on documents stored in the cloud database, wherein the single index facilitates a user to search the documents stored in the database, the index generator comprising:
      a pre-processing module configured to facilitate a user to provide one or more inputs for creating a plurality of indexes on documents stored in the cloud database via an interface, the one or more inputs comprising a first value representing number of documents to be assigned a single index;
      a fetching module configured to retrieve all the documents stored in the database and calculate the total number of documents, wherein the total number of documents is represented by a second value;
      an estimation module configured to receive the first value from the pre-processing module, receive the second value from the fetching module and estimate the total number of indexes to be created based on the first value and the second value;
      an execution module configured to receive the estimated value from the estimation module, execute a loop for creating the plurality of indexes on documents for a predetermined number of iterations, the predetermined number of iterations corresponding to the estimated value; and
      a generation module configured to merge the indexed documents to create a single index.

11. The system of claim 10, wherein the index generator is configured to:
   create a plurality of indexes on the documents stored in the cloud database using the indexing engine;
   merge the plurality of indexes into a single index; and
   store the single index in a specific location in a database.

12. The system of claim 10, wherein the indexing engine comprises a lucene engine.

13. The system of claim 10, wherein the execution module is configured to:
   retrieve the documents from the documents corresponding to each iteration;
   index the documents, using the indexing engine, resulting in creation of the plurality of indexes; and
   store the plurality of indexed documents.

14. A computer program product comprising a non-transitory computer-readable medium having computer-executable instructions stored thereon, that, when executed by a processor, cause the processor to perform a method, the method comprising:
   providing one or more inputs for creating a plurality of indexes on documents stored in the cloud database, wherein the one or more inputs include at least in part a first value representing number of documents to be assigned a single index;

determining total number of documents stored in the cloud database, wherein the total number of documents is represented by a second value;

estimating total number of indexes to be created based on the first value and the second value;

executing a loop to create plurality of indexes on documents for a predetermined number of iterations, wherein the predetermined number of iterations correspond to the estimated value; and merging the plurality of indexes to create a single index, wherein the single index facilitates a user to search the documents stored in the cloud database.

\* \* \* \* \*